(12) United States Patent
Carlos et al.

(10) Patent No.: US 10,379,695 B2
(45) Date of Patent: Aug. 13, 2019

(54) LOCKING INTERACTIVE ASSETS ON LARGE GESTURE-SENSITIVE SCREEN DISPLAYS

(71) Applicant: PRYSM, INC, San Jose, CA (US)

(72) Inventors: Dino Carlos, Fishers, IN (US); Adam Cuzzort, Westfield, IN (US); Brandon Fischer, Carmel, IN (US)

(73) Assignee: PRYSM, INC., San Jose, CA (US)

( * ) Notice: Subject to any disclaimer, the term of this patent is extended or adjusted under 35 U.S.C. 154(b) by 0 days.

(21) Appl. No.: 14/675,615

(22) Filed: Mar. 31, 2015

(65) Prior Publication Data

US 2015/0205453 A1 Jul. 23, 2015
US 2017/0177165 A9 Jun. 22, 2017

Related U.S. Application Data

(63) Continuation-in-part of application No. 13/773,015, filed on Feb. 21, 2013, now abandoned.

(60) Provisional application No. 61/601,182, filed on Feb. 21, 2012.

(51) Int. Cl.

| | |
|---|---|
| *G06F 15/16* | (2006.01) |
| *G06F 3/0481* | (2013.01) |
| *G06F 3/0484* | (2013.01) |
| *G06F 3/0488* | (2013.01) |
| *H04L 29/08* | (2006.01) |
| *H04L 29/06* | (2006.01) |

(52) U.S. Cl.
CPC ........ *G06F 3/0481* (2013.01); *G06F 3/04845* (2013.01); *G06F 3/04847* (2013.01); *G06F 3/04883* (2013.01); *H04L 65/4015* (2013.01); *H04L 67/1095* (2013.01)

(58) Field of Classification Search
CPC ..... G06F 3/0481; G06F 3/04883; G06F 3/017
See application file for complete search history.

(56) References Cited

U.S. PATENT DOCUMENTS

| 7,769,810 B1 | 8/2010 | Kaufman | |
|---|---|---|---|
| 7,793,018 B1* | 9/2010 | Teng | G06F 3/0481 |
| | | | 710/72 |
| 7,908,325 B1* | 3/2011 | Pabla | G06F 9/542 |
| | | | 709/205 |
| 8,407,290 B2 | 3/2013 | Abt, Jr. | |

(Continued)

*Primary Examiner* — Shean Tokuta
(74) *Attorney, Agent, or Firm* — Artegis Law Group, LLP

(57) ABSTRACT

One embodiment of the present invention sets forth a method for displaying content on a gesture-sensitive display surface. The method includes causing an interactive window asset to be displayed on the gesture-sensitive surface with at least one of an adjustable display height, an adjustable display width, and an adjustable display location on the gesture-sensitive display surface, wherein the interactive window asset includes at least one display output generated by a software application and is configured to receive one or more software application inputs via the gesture-sensitive display surface, receiving a mode change input via the gesture-sensitive display surface, and, in response to receiving the mode change input, causing the interactive window asset to be displayed on the gesture-sensitive display surface with a fixed display height, a fixed display width, and a fixed display location.

19 Claims, 7 Drawing Sheets

(56) References Cited

U.S. PATENT DOCUMENTS

| | | | |
|---|---|---|---|
| 8,793,620 B2* | 7/2014 | Stafford | G06F 3/012 715/862 |
| 8,922,590 B1* | 12/2014 | Luckett, Jr. | G09G 5/377 345/633 |
| 8,949,924 B2* | 2/2015 | Seo | H04N 5/45 725/100 |
| 2009/0033616 A1* | 2/2009 | Miyagi | G06F 3/04883 345/104 |
| 2009/0157811 A1 | 6/2009 | Bailor | |
| 2009/0172101 A1 | 7/2009 | Arthursson | |
| 2009/0271713 A1 | 10/2009 | Skull et al. | |
| 2011/0119609 A1* | 5/2011 | Bhatt | G06F 3/0481 715/765 |
| 2011/0231797 A1* | 9/2011 | Huhtala | G06F 1/1626 715/811 |
| 2011/0258216 A1* | 10/2011 | Supakkul | G06F 3/04812 707/769 |
| 2012/0054674 A1* | 3/2012 | Beykpour | G06F 3/0481 715/788 |
| 2012/0120316 A1* | 5/2012 | Lee | H04N 21/42204 348/564 |
| 2013/0198653 A1 | 8/2013 | Tse et al. | |
| 2013/0305184 A1* | 11/2013 | Kim | G06F 3/0481 715/781 |
| 2014/0013254 A1* | 1/2014 | Hosein | G06F 3/04817 715/765 |
| 2014/0033067 A1 | 1/2014 | Pittenger et al. | |
| 2014/0047332 A1* | 2/2014 | Liu | G06F 17/24 715/273 |
| 2014/0053189 A1* | 2/2014 | Lee | H04N 21/4858 725/37 |
| 2014/0090084 A1 | 3/2014 | Goodinson | |
| 2014/0181736 A1* | 6/2014 | Dong | G06F 3/0481 715/799 |
| 2014/0207964 A1* | 7/2014 | Philpott | H04L 65/4084 709/231 |
| 2014/0208274 A1* | 7/2014 | Smyth | G06F 3/0304 715/863 |
| 2014/0250371 A1* | 9/2014 | Wabyick | G06F 17/21 715/243 |
| 2014/0282126 A1* | 9/2014 | Ma | G06F 8/34 715/762 |
| 2014/0307230 A1 | 10/2014 | Hajjar | |
| 2014/0344766 A1* | 11/2014 | Cao | G06F 3/017 715/863 |
| 2014/0351721 A1* | 11/2014 | DeLuca | G06F 3/1423 715/760 |
| 2014/0362119 A1* | 12/2014 | Freund | G06F 3/017 345/661 |
| 2014/0362300 A1 | 12/2014 | Hajjar | |
| 2014/0372136 A1* | 12/2014 | Lee | G16H 40/63 705/2 |
| 2015/0015513 A1* | 1/2015 | Kwak | G06F 3/0412 345/173 |
| 2015/0058770 A1* | 2/2015 | Steinbach | G06F 3/0481 715/767 |
| 2015/0074589 A1* | 3/2015 | Pan | G06F 3/04886 715/781 |
| 2015/0133199 A1* | 5/2015 | Lee | G06Q 30/0241 455/566 |
| 2015/0143225 A1* | 5/2015 | Pflueger | G06F 17/2247 715/234 |
| 2015/0212703 A1* | 7/2015 | Luckett, Jr. | G09G 5/377 345/158 |
| 2015/0213355 A1* | 7/2015 | Sharma | G06N 3/006 706/11 |
| 2015/0220299 A1* | 8/2015 | Kim | G06F 3/0488 345/1.3 |

\* cited by examiner

LOCKING INTERACTIVE ASSETS ON LARGE GESTURE-SENSITIVE SCREEN DISPLAYS

CROSS-REFERENCE TO RELATED APPLICATIONS

This application is a continuation-in-part (CIP) of United States patent application titled "System, Method, and Computer-Readable Medium for Interactive Collaboration" filed on Feb. 21, 2013 and having Ser. No. 13/773,015. The subject matter of this related application is hereby incorporated herein by reference.

BACKGROUND OF THE INVENTION

Field of the Invention

Embodiments of the present invention relate generally to large displays and, more specifically, to locking interactive assets on large gesture-sensitive screen displays.

Description of the Related Art

Large multi-touch display walls combine the intuitive interactive capabilities of touch-screen technology with the immersive display features of large screens. Large multi-touch display walls allow presenters to display a multitude of assets, such as images, videos, documents, and presentation slides, and also interact with these assets by touching them. Touch or gesture-based interactions may include dragging assets to reposition them on the screen, tapping assets to display menu options, swiping assets to page through documents, or using pinch gestures to resize assets. Via such interactions, multi-touch display walls facilitate more flexible and emphatic presentation of material to an audience, for example by annotating written or image content in an asset, starting and stopping a video in an asset, etc.

However, touch interactions performed during a particular presentation can result in unwanted modifications being made to one or more assets displayed on a display wall as part of the presentation. For example, inadvertent touches to or gestures near the display wall may cause accidental relocation or re-sizing of an asset. Such modifications to the size or location of assets in a carefully assembled presentation are generally unwanted, and can be inconvenient and time-consuming to correct, particularly when a presentation includes a large number of assets.

As the foregoing illustrates, what would be useful is a more effective approach to displaying interactive assets on large gesture-sensitive screen displays.

SUMMARY OF THE INVENTION

One embodiment of the present invention sets forth a method for displaying content on a gesture-sensitive display surface. The method includes causing an interactive window asset to be displayed on the gesture-sensitive surface with at least one of an adjustable display height, an adjustable display width, and an adjustable display location on the gesture-sensitive display surface, wherein the interactive window asset includes at least one display output generated by a software application and is configured to receive one or more software application inputs via the gesture-sensitive display surface, receiving a mode change input via the gesture-sensitive display surface, and, in response to receiving the mode change input, causing the interactive window asset to be displayed on the gesture-sensitive display surface with a fixed display height, a fixed display width, and a fixed display location.

At least one advantage of the disclosed embodiments is that assets being displayed as part of a presentation can be switched to a mode in which asset position and size are locked, but the asset can still be interacted with in other ways by a presenter.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
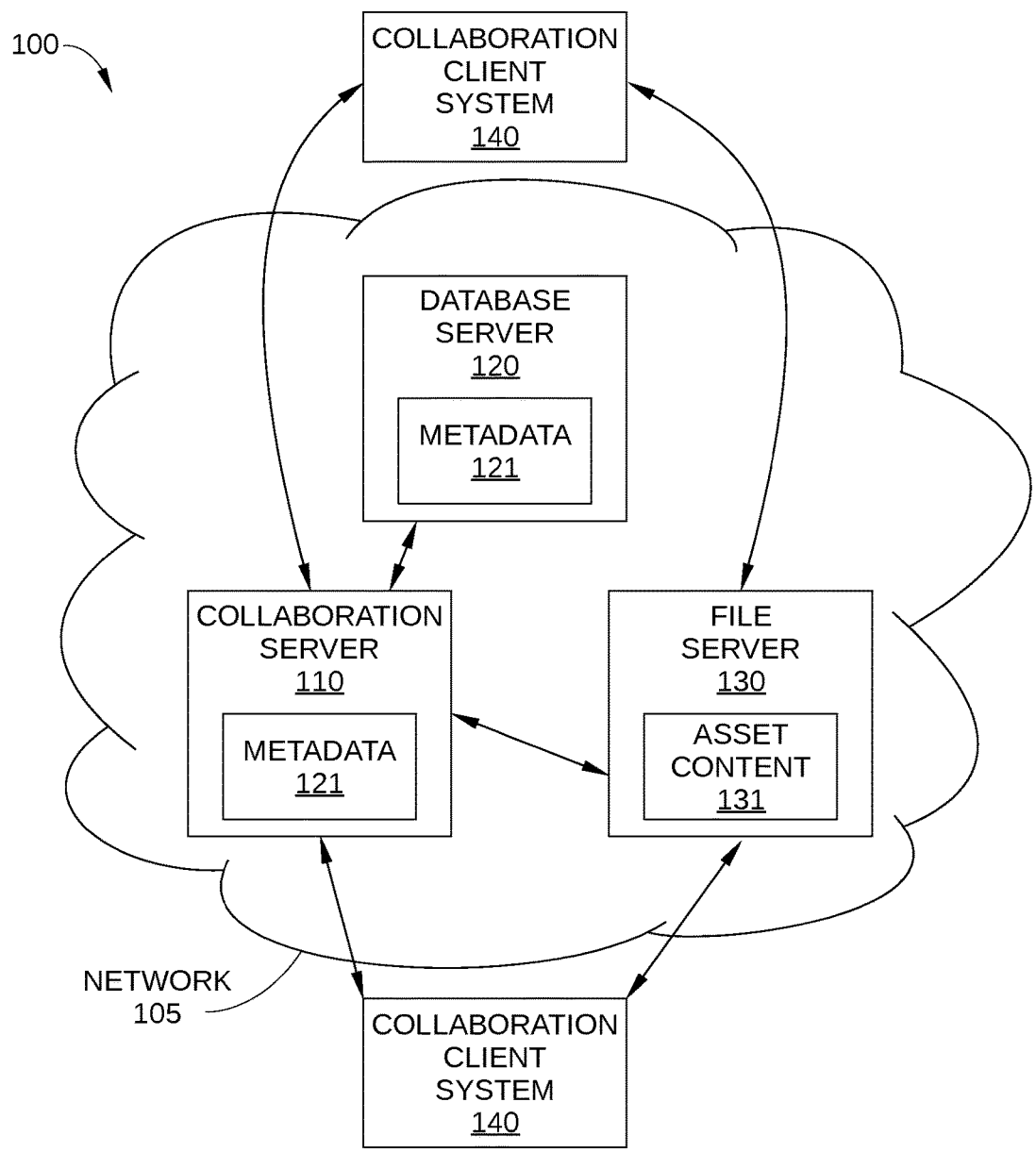
FIG. 1 is a block diagram of a multi-media collaboration environment configured to implement one or more aspects of the present invention.

FIG. 1 is a block diagram of a collaboration environment 100 configured to implement one or more aspects of the present invention. Collaboration environment 100 is a multi-media collaboration platform configured to provide an interface to multiple users at multiple locations for interacting with displayed content and each other, and for collaboratively modifying the displayed content. Collaboration environment 100 may include a collaboration server 110, a database server 120, a file server 130, and a plurality of collaboration client systems 140. Collaboration server 110, database server 120, and file server 130 may be implemented as shown as separate and distinct computing structures coupled to each other and to collaboration client systems 140 via a network 105. Alternatively, the functionality of collaboration server 110, database server 120, and file server 130 may be implemented as a single computing structure in a single location, or in any other technically feasible combination of structures. Further, one or more of collaboration server 110, database server 120, and/or file server 130 may be implemented as a distributed computing system. Network 105 may be via any technically feasible communications or information network, wired or wireless, that allows data exchange, such as a wide area network (WAN), a local area network (LAN), a wireless (WiFi) network, and/or the Internet, among others.

Collaboration server 110 coordinates the flow of information between the various collaboration client systems 140, database server 120, and file server 130. Thus, in some embodiments, collaboration server 110 is a streaming server for collaboration client systems 140. In some embodiments, the application program interface (API) endpoint for collaboration client systems 140 and/or business logic associated with collaboration environment 100 resides in collaboration server 110. In addition, collaboration server 110 receives requests from collaboration client systems 140 and can send notifications to collaboration client systems 140. Therefore, there is generally a two-way connection between collaboration server 110 and each of collaboration client systems 140. Alternatively or additionally, collaboration client systems 140 may make requests on collaboration server 110 through the API. For example, during collaborative work on a particular project via collaboration environment 100, a collaboration client system 140 may send a request to collaboration server 110 for information associated with an interactive window asset to display the asset in a workspace of the particular project.

An interactive window asset, or "asset," may be any interactive renderable content that can be displayed on a display surface of collaboration environment 100 within a dynamically adjustable presentation window. For simplicity, an asset and corresponding dynamically adjustable presentation window are generally referred to herein as a single entity, i.e., an "asset." Assets may include application environments, images, videos, web browsers, documents, mirroring or renderings of laptop screens, presentation slides, any other graphical user interface (GUI) of a software application, and the like. An asset generally includes at least one display output generated by a software application, such as a GUI of the software application or some other renderable content associated with the software application. In addition, an asset is generally configured to receive one or more software application inputs via a gesture-sensitive display surface of a collaboration client system 140, i.e., inputs received via the gesture-sensitive display surface are received by the asset and treated as input for the software application associated with the asset. Thus, unlike a fixed image, an asset is a dynamic element that enables interaction with the software application associated with the asset, for example, for manipulation of the asset. For example, an asset may include select buttons, pull-down menus, control sliders, etc. that are associated with the software application, and can provide inputs to the software application.

A workspace is a digital canvas on which assets associated therewith are displayed within a suitable dynamic presentation window on a gesture-sensitive display surface of one or more collaboration client systems 140. Typically, a workspace corresponds to the all of the potential render space of a collaboration client system 140, so that only a single workspace can be displayed on the surface of a gesture-sensitive display surface of the collaboration client system 140. However, in some embodiments, multiple workspaces may be displayed on a gesture-sensitive display surface concurrently, such as when a workspace does not correspond to the entire gesture-sensitive display surface. Assets associated with a workspace are typically displayed in the workspace within a suitable presentation window that has user-adjustable display height, width, and location. Generally, a workspace is associated with a particular project, which is typically a collection of multiple workspaces.

Database server 120 stores metadata 121 associated with collaboration environment 100, such as metadata for specific assets, workspaces, and/or projects. For example, such metadata may include which assets are associated with a particular workspace, which workspaces are associated with a particular project, the state of various setting for each workspace, annotations made to specific assets, etc. In some embodiments, asset metadata may also include size of the presentation window associated with the asset and position of the presentation window in a particular workspace. In some embodiments, asset size and location metadata may be calculated metadata that are dimensionless. In such embodiments, the asset size may be in terms of aspect ratio, and asset position in terms of percent location along an x- and y-axis of the associated workspace. Thus, when gesture-sensitive display surfaces of collaboration client systems 140 are not uniformly sized, each asset can still be positioned and sized proportional to the specific workspace in which is it being displayed. In some embodiments, collaboration server 110 may include certain portions of metadata 121, such as asset metadata.

File server 130 is the physical location for some or all asset content 131 that are rendered as files, such as documents, images, and videos. In some embodiments, file server 130 can receive requests for asset content 131 directly from collaboration client systems 140. For example, an asset, such as a word-processing document, may be associated with a workspace that is displayed on the gesture-sensitive display surface of first and second collaboration client systems 140. When the asset is modified by a user at the first collaboration client system 140, metadata for a file associated with the asset is updated in file server 130 by collaboration server 110, the second collaboration client system 140 downloads the updated metadata for the file from file server 130, and the asset is then displayed, as updated, on the gesture-sensitive display surface of the second collaboration client system 140.

Each of collaboration client systems 140 is an instance of a collaborative multi-media platform disposed at a different location in collaboration environment 100. Each collaboration client system 140 is configured to provide a digital system that can be mirrored at one or more additional and remotely located collaboration client systems 140. Thus, collaboration clients facilitate the collaborative modification of assets, workspaces, and/or complete presentations or other projects, as well as the presentation thereof. One embodiment of a collaboration client system 140 is described below in conjunction with FIG. 2.

Figure 2:
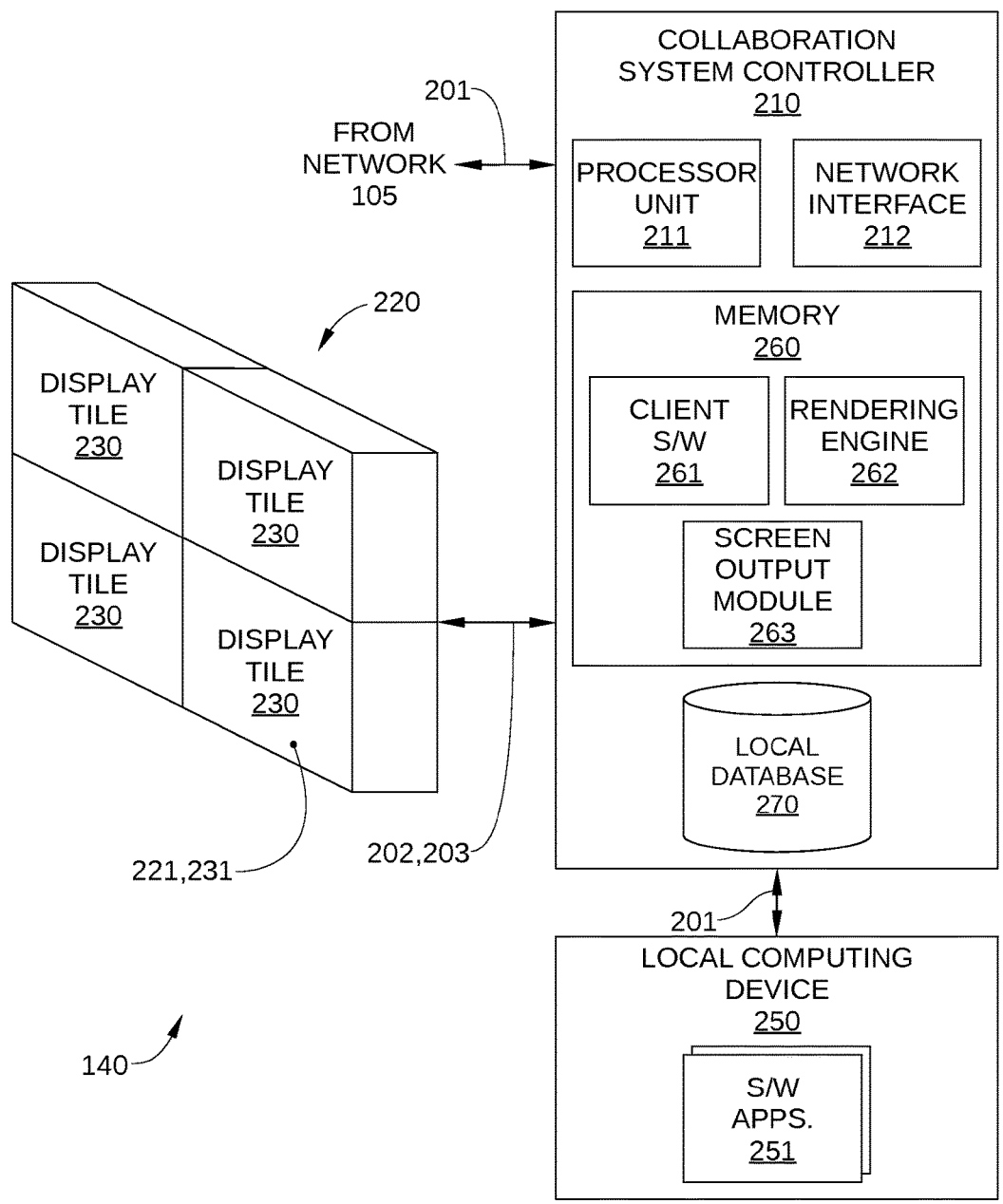
FIG. 2 is a block diagram of a collaboration client system configured to implement one or more aspects of the present invention.

FIG. 2 is a block diagram of a collaboration client system 140 configured to implement one or more aspects of the present invention. As shown, collaboration client 140 includes, without limitation, a collaboration system controller 210 and an interactive display wall 220. In some embodiments, a local computing device 250 may be coupled to collaboration system controller 210 as well. In other embodiments, collaboration client system 140 may include a single screen, a computer display, electronic tablet, smart phone, or any other single-screen device.

Collaboration system controller 210 receives digital content 201 from local computing device 250 or from another remotely located collaboration client system 140 via collaboration server 110 and information network 105 (both shown in FIG. 1). Digital content 201 may include images, videos, documents, or other content associated with one or more assets. Collaboration system controller 210 then converts digital content 201 into image data signals 202 and transmits image data signals 202 to interactive display wall 220 for display.

Collaboration system controller 210 includes a processor unit 211, a memory 212, a network interface 212, and in some embodiments a local database 270. Processor unit 211 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processor unit 211 may be any technically feasible hardware unit capable of processing data and/or executing software applications to facilitate operation of collaboration client system 140, including client software 261, a rendering engine 262, and a screen output module 263. During operation, client software 261, rendering engine 262, and screen output module 263 may reside in memory 212, and are described below in conjunction with FIG. 4. In some embodiments, one or more of client software 261, rendering engine 262, and screen output module 263 may be implemented in firmware, either in collaboration system controller 210 and/or in other components of collaboration client system 140.

Memory 212 may include volatile memory, such as a random access memory (RAM) module, and non-volatile memory, such as a flash memory unit, a read-only memory (ROM), or a magnetic or optical disk drive, or any other type of memory unit or combination thereof. Memory 212 is configured to store any software programs, operating system, drivers, and the like, that facilitate operation of collaboration client system 140, including client software 261, rendering engine 262, and screen output module 263.

Interactive display wall 220 may include the display surface or surfaces of any technically feasible display device or system type, including but not limited to the display surface of a light-emitting diode (LED) display, a digital light (DLP) or other projection display, a liquid crystal display (LCD), an optical light-emitting diode display (OLED), a laser-phosphor display (LPD), and/or a stereo 3D display, all arranged as a single stand-alone display, head-mounted display, or as a single or multi-screen tiled array of displays. Display sizes may range from smaller handheld or head-mounted display devices to full wall displays. In the example illustrated in FIG. 2, interactive display wall 220 includes a plurality of display tiles 230 mounted in a 2×2 array. Other configurations and array dimensions of multiple electronic display devices, e.g. 1×4, 2×3, 5×6, etc., also fall within the scope of the present invention.

Local computing device 250 may be a desktop computer, a laptop computer, a smart phone, a personal digital assistant (PDA), video game console, set top console, tablet computer, or any other type of computing device configured to receive input, process data, and display images, and is suitable for practicing one or more embodiments of the present invention. In some embodiments, software applications 251 may reside in computing device 250. Examples of software applications 251 may include slide show presentation software, word processor software, collaboration design software, image editing software, video player software, and remote conferencing applications.

In embodiments in which collaboration client system 140 is configured as a stand-alone system, and is not coupled to network 105, collaboration client system 140 may include local database 270. Local database 270 generally stores metadata normally provided by collaboration server 110, such as metadata for specific assets, workspaces, and/or projects.

Interactive display wall 220 includes one or more display tiles 230, a display surface 221, and a gesture-sensitive surface 231. Display surface 221 extends across display surface 221, and typically includes the combined display surfaces of display tiles 230. Likewise, gesture-sensitive surface 231 extends across display surface 221. Consequently, gesture-sensitive surface 231 and display surface 221 are generally referred to as a single construct, i.e., a gesture-sensitive display surface.

Taken together, gesture-sensitive surface 231 and display surface 221 enable users to interact with assets displayed on the wall using touch or proximity gestures including tapping, dragging, swiping, and pinching, in addition to conventional cursor inputs. These touch gestures may replace or supplement the use of typical peripheral I/O devices such as an external keyboard or mouse. Gesture-sensitive surface 231 may be a "multi-touch" surface, which can recognize more than one point of contact on interactive display wall 220, enabling the recognition of complex gestures, such as two or three-finger swipes, pinch gestures, and rotation gestures, as well as multiuser gestures. Thus, one or more users may interact with assets on interactive display wall 220 using touch gestures such as dragging to reposition assets on the screen, tapping assets to display menu options, swiping to page through assets, or using pinch gestures to resize assets. Multiple users may also interact with assets on the screen simultaneously. In some embodiments, gesture-sensitive surface 231 may include an array of infra-red beams that, when interrupted, indicate user hand or finger position. Thus, in such embodiments, gesture-sensitive surface 231 is not strictly a touch-screen, but effectively operates as one.

In operation, interactive display wall 220 displays image data signal 202 that are output from controller 210. For a tiled display, as illustrated in FIG. 2, image data signals 202 are appropriately distributed among display tiles 230 such that a coherent image is displayed on a display surface 221 of interactive display wall 220. Gesture signals 203 generated by gesture-sensitive surface 231 are sent from interactive display wall 220 to collaboration system controller 210 for processing and interpretation.

It will be appreciated that collaboration client system 140 described herein is illustrative and that variations and modifications are possible. For example, client software 261, rendering engine 262, and/or screen output module 263 may reside outside of collaboration system controller 210. In another example, collaboration client system 140 may be configured as a stand-alone system, in which the functionality of collaboration server 110, a database server 120, a file server 130 of FIG. 1 may be implemented locally in collaboration client system 140.

Figure 3:
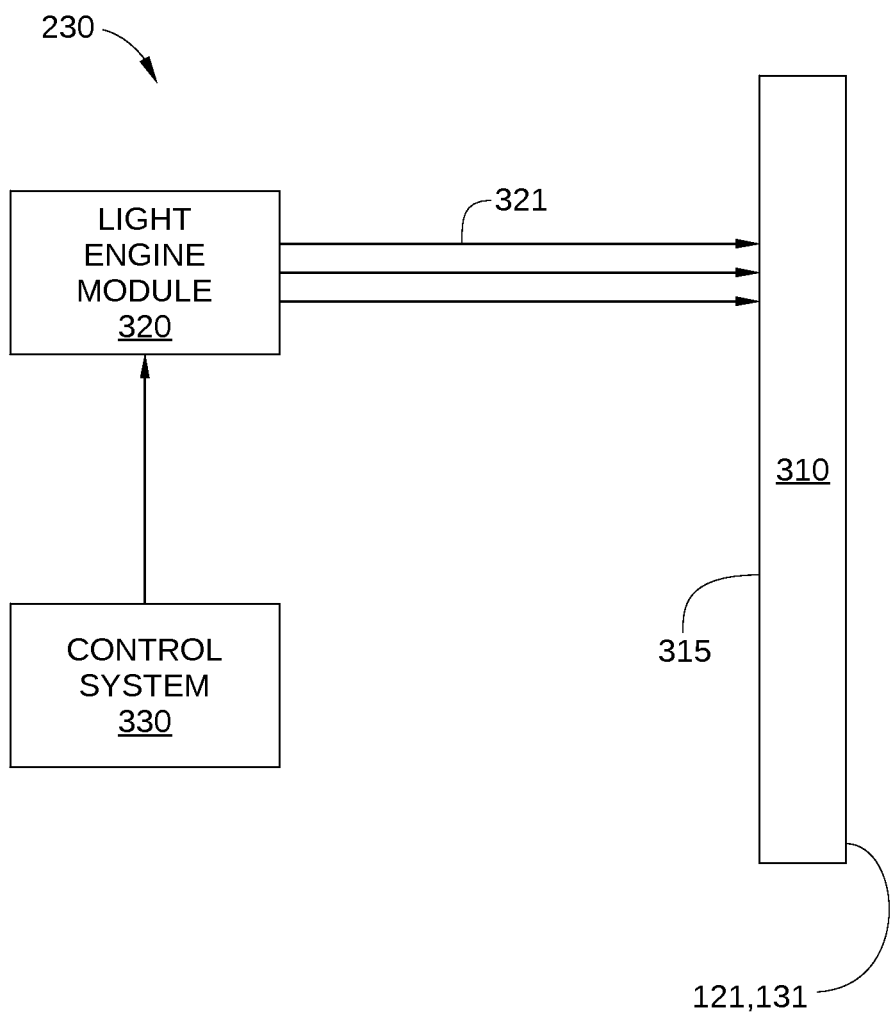
FIG. 3 is a schematic diagram of a display tile of the collaboration client system in FIG. 2 configured to implement one or more aspects of the present invention.

FIG. 3 is a schematic diagram of a display tile 230 configured to implement one or more aspects of the present invention. FIG. 3 is an example configuration only, and any other technically feasible display device suitable for forming display wall 220 may be implemented in alternative embodiments. As shown, display tile 230 includes, without limitation, a display screen region 310, a light engine module 320, and a control system 330. The display screen region 310 is configured to display digital images that are visible to a viewer.

Light engine module 320 is configured to emit one or more scanning beams (e.g., laser beams 321) onto a scan surface 315 of display screen region 310. Display screen region 310 may include a phosphor layer (not shown) that phosphoresces when excited by the optical energy conducted by the one or more laser beams 321, thereby creating visible light. The light engine module 320 is configured to emit one or more laser beams 322 that sweep across the phosphor layer of the display screen region 310 in a pulse width and pulse amplitude modulation manner in order to create visible light that represents an image. The visible light associated with the image emanates through an image surface of the display screen region 310 to a viewer.

The control system 330 is configured to transmit command data to the light engine module 320 to cause light engine module 320 to emit laser beams 321 onto scan surface 315. Control system 330 controls and modulates laser beams 321 emitted by the light engine module 320 so that laser beams 321 are modulated to carry the image to be displayed on scan surface 315. The control system can include a digital image processor that generates digital image signals for three different color channels and laser driver circuits that produce laser control signals carrying the digital image signals. The laser control signals are then applied to modulate the lasers, e.g., the currents for laser diodes.

More detailed descriptions of display devices suitable for being configured as a display tile 330 in a collaboration client systems 140 may be found in US Patent Publication 2014/0307230, published Oct. 16, 2014 and entitled "SELF ALIGNING IMAGER ARRAY" and US Patent Publication 2014/0362300, published Dec. 11, 2014 and entitled "Servo Feedback Control Based on Invisible Scanning Servo Beam in Scanning Beam Display Systems with Light-Emitting Screens."

Figure 4:
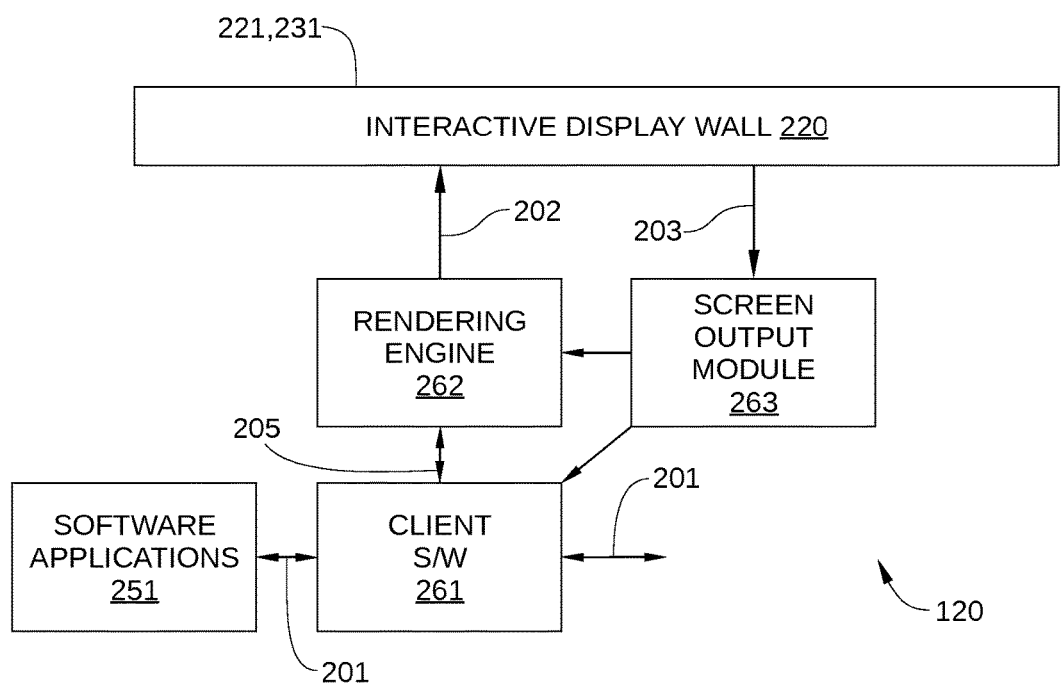
FIG. 4 is a block diagram illustrating the operation of the collaboration client system of FIG. 2, according to one embodiment of the present invention.

FIG. 4 is a block diagram illustrating the operation of collaboration client system 140, according to one embodiment of the present invention. As shown, FIG. 4 includes, without limitation, client software 261, rendering engine 262, screen output module 263, and software applications 251.

Client software 261 pulls digital content 201 from collaboration server 110 and file server 130 (shown in FIG. 1), and generates workspaces based on this digital content 201. As described above, a workspace is the digital canvas on which assets are arranged and interacted with, and can be displayed on interactive display wall 220. Client software 261 also receives digital content 201 from software applications 251, which reside on local computing device 250 and generate assets to be displayed on interactive display wall 220. Client software 261 also transmits digital content 201 to collaboration server 110 and file server 130, such as metadata associated with modifications made to an asset on interactive display wall 220. In addition, client software 261 sends render content 205 to rendering engine 262. Render content 205 is based on the digital content 201 that is to be displayed on interactive display wall 220.

In addition, in some embodiments client software 261 is responsible for determining whether gesture-based input received via gesture-sensitive display surface 231 is associated with an asset that is in a locked position mode or an unlocked position mode, and responding accordingly. According to some embodiments, gesture-based interactions for an asset in a locked position mode are limited. Specifically, once an asset is placed in locked position mode, position modifications can no longer be made to the asset. Thus, when gesture-based input received via gesture-sensitive display surface 231 is associated with an asset that is in a locked position mode, and the gesture-based input indicates performing a proscribed position modification, client software 261 ignores the gesture-based input. By contrast, if the gesture-based input indicates an allowed interaction with the asset, client software 261 notifies the software application 251 associated with the asset, and the gesture-based input is acted upon accordingly.

Examples of position modifications that may be proscribed when an asset is in locked position mode include the changing the display location on a workspace and/or the display height or width on the workspace. Consequently, the position and/or size of the asset cannot be modified by a gesture-based input, and the asset cannot be inadvertently repositioned or resized during other user interactions with the asset. In some embodiments, other gesture-based interactions are still enabled in locked position mode. For example, software application inputs may still be enabled, which include user inputs configured for interacting with the software application associated with the asset that is in locked position mode. Thus, a user can control, modify, or otherwise interact with the asset in locked position mode via display elements that are displayed as part of the asset and are configured for receiving input, such as buttons, icons, pull-down menus, etc. Additionally or alternatively, in some embodiments, annotations may be made to an asset when the asset is in locked position mode. Thus, a user can interact extensively with assets and annotate assets in a workspace without accidentally resizing or repositioning the assets. Furthermore, in some embodiments, the annotations may be saved when the workspace associated with the annotated asset is closed. Alternatively, in embodiments in which a read-only mode is employed, such annotations are deleted when the workspace associated with the asset is closed.

In some embodiments, client software 261 is responsible for tracking the status of each asset and/or workspace displayed by interactive display wall 220. For example, client software 261 may track whether each asset or workspace is in locked position mode or an unlocked position mode. In such embodiments, client software 261 notifies collaboration server 110 of changes in mode for assets and workspaces currently being displayed. Collaboration server 110 updates metadata 121 of these changes, which are in turn retrieved by the other collaboration client systems 140, so that other collaboration client systems 140 in FIG. 1 can display assets and workspaces in the same mode. In addition, client software 261 may store metadata associated with locked position mode and unlocked position mode locally, including metadata modified by other collaboration client systems 140. In some embodiments, client software 261 may be configured to request updated metadata whenever a user logs on to a collaboration client system 140. Furthermore, in some embodiments, client software 261 may also track whether a workspace that is currently displayed is in read-only mode.

Read-only mode can be assigned to one or more workspaces of a project, and prevents modifications to or interactions with assets associated with a particular workspace from being saved. Thus, while assets may be repositioned, resized, annotated, and otherwise modified or interacted with, once the workspace associated with that asset is closed, all modifications to the workspace and assets associated with the workspace are deleted. Read-only mode may be toggled on or off for a particular work asset via standard gesture-based and/or cursor-based GUI inputs.

Rendering engine 262 receives render content 205 and sends image data signals 202 to interactive display wall 220.

Typically, rendering engine is responsible for determining the output for each pixel of interactive display wall 220. Screen output module 263 is responsible for receiving and interpreting gesture signals 203 from gesture-sensitive surface 231 of interactive display wall 220. When a user touches an asset or interacts with an asset using a gesture on interactive display wall 220, screen output module 263 sends information associated with this gesture-based input event to rendering engine 262 and/or to client software 261. This gesture information includes the location of the touch or gesture on display surface 231, i.e., the target location, and the type of touch gesture (e.g., tap, swipe, or pinch). Rendering engine 262 then provides the gesture information to client software 261. Based on the asset to which the gesture information is associated and the current mode of the asset, client software 261 determines whether the gesture is communicated to the appropriate software application 251 or ignored.

Figure 5:
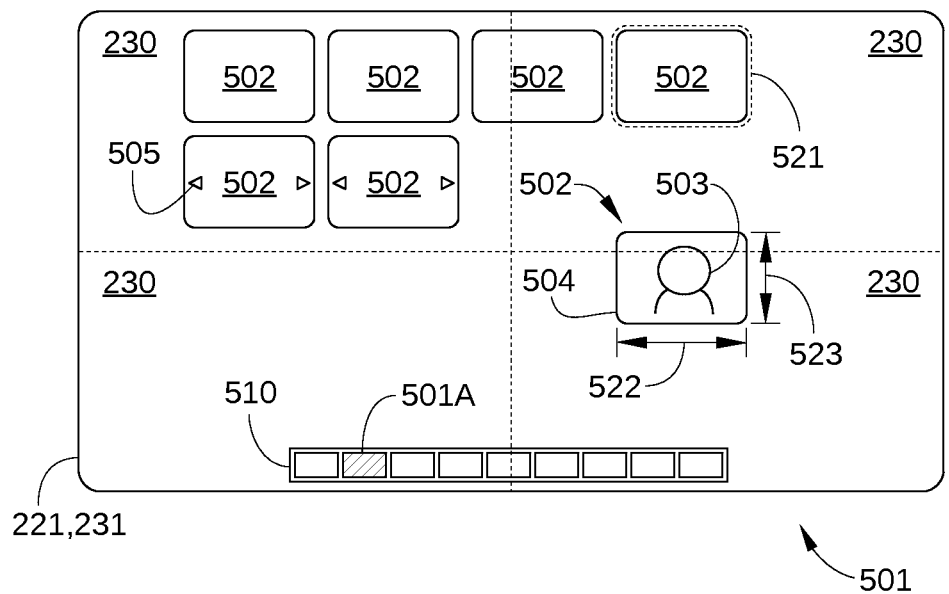
FIG. 5 illustrates a workspace displayed on display surface of an interactive display wall, according to one embodiment of the present invention.

FIG. 5 illustrates a workspace 501 displayed on display surface 221 of interactive display wall 220, according to one embodiment of the present invention. Workspace 501 includes multiple assets 502 and a workspace menu 510. As shown, each asset 502 may be positioned at a particular location on display surface 221, and may be displayed by one or multiple display tiles 230. Each asset 502 includes asset content 503 that is displayed within a presentation window 504. In addition, the presentation window 504 of each asset 502 includes a display location 521, a display width 522, and a display height 523. Workspace menu 510 includes icons representing some or all of the workspaces associated with a particular project. In the embodiment illustrated in FIG. 5, workspace 501 is indicated in workspace menu 510 by an icon 501A (cross-hatched). Generally, each asset 502 includes one or more graphical user elements 505 associated with the asset 502 and configured to receive one or more inputs for the software application associated with the asset via gesture-sensitive display surface 231.

When workspace 501 is placed in position lock mode, the display location 521, the display width 522, and the display height 523 associated with each asset 502 are locked, and therefore are not modified by gesture-based inputs related to resizing or repositioning the asset 502. In some embodiments, assets 502 that are locked are displayed on display surface 221 with a fixed display height, a fixed display width, and a fixed display location. In some embodiments, the fixed display height is a predetermined display height in workspace 501, the fixed display width is a predetermined display width in workspace 501, and/or the fixed display location is a predetermined display location in workspace 501. In such embodiments, an asset 502 that is locked therefore may be repositioned as a result of being placed in locked position mode, but is then not able to be repositioned or resized until removed from locked position mode.

In some embodiments, cursor-based inputs are also prevented from modifying display locations 521, display widths 522, and display heights 523 in workspace 501. Alternatively or additionally, in some embodiments, each particular asset 502 of workspace 501 can be toggled between locked position mode and unlocked position mode. It is noted that other gesture-based inputs associated with a locked asset are recognized, such as swiping a document asset to page through the asset.

Figure 6A:
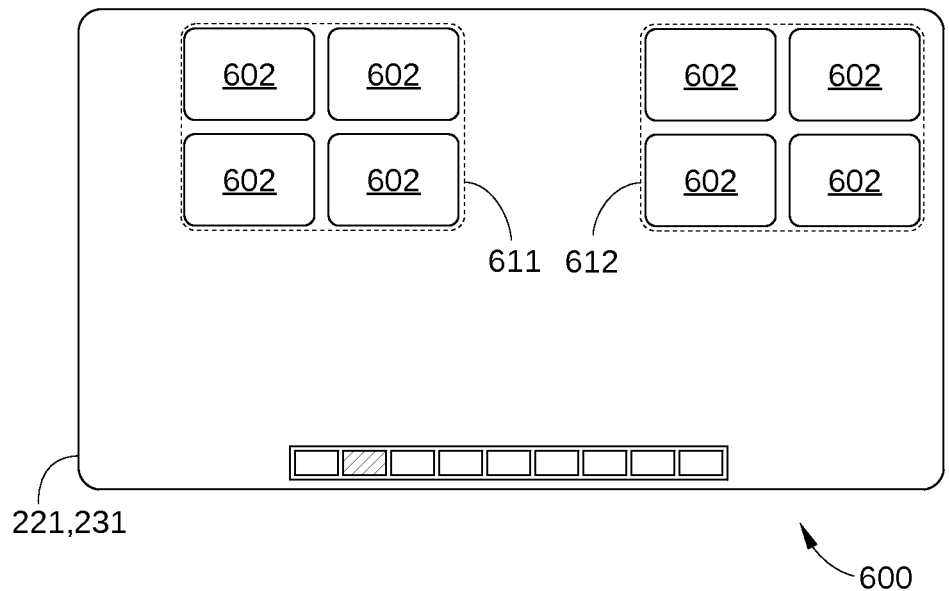
FIGS. 6A-6B illustrate a workspace displayed on a display surface, in which assets disposed in a particular region of the workspace are placed in locked position mode, according to one embodiment of the present invention.
Figure 6B:
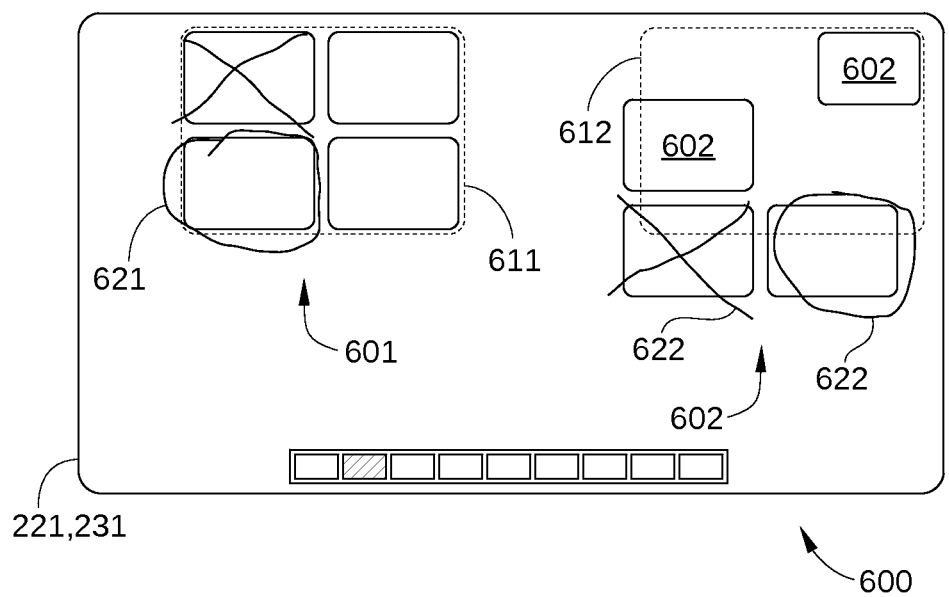

FIGS. 6A-6B illustrate a workspace 600 displayed on display surface 221, in which assets disposed in a particular region 611 of workspace 600 are placed in locked position mode, according to one embodiment of the present invention. Workspace 600 includes multiple assets 601 and 602. As shown, assets 601 are disposed in region 611 of workspace 601 while assets 602 are disposed in region 612 of workspace 600. In addition, assets in region 611 are toggled to locked position mode, and assets in region 612 are in unlocked position mode.

FIG. 6A illustrates workspace 600 prior to user interactions therewith. FIG. 6B illustrates workspace 600 after user interactions therewith, such as the addition of annotations 621 to assets 601, the addition of annotations 622 to assets 602, and the modification of the display position of some of assets 602. It is noted that assets 601 have been annotated, but neither reposition nor resized. By contrast, some of assets 602 have not only been annotated, but also repositioned and/or resized, since assets 602 are in unlocked position mode.

Regions of a workspace in which assets may be defined as in either locked position mode or unlocked position mode may be user-defined regions. Alternatively or additionally, such regions may be predetermined regions, e.g., a left half or a right half of display surface 221.

Figure 7:
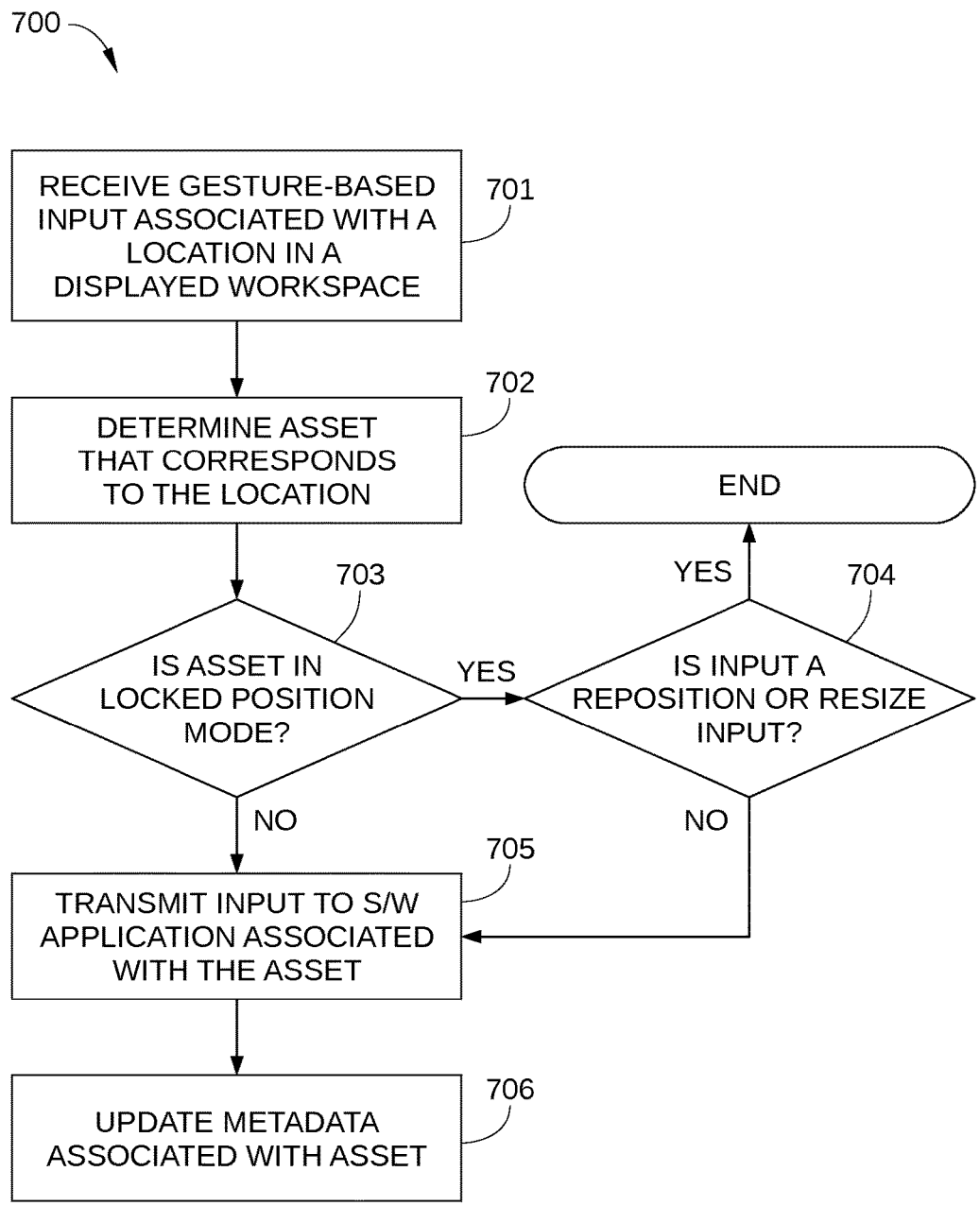
FIG. 7 sets forth a flowchart of method steps for displaying content on a display surface, according to one embodiment of the present invention.

FIG. 7 sets forth a flowchart of method steps for displaying content on a display surface, according to one embodiment of the present invention. Although the method steps are described with respect to the systems of FIGS. 1-6B, persons skilled in the art will understand that any system configured to perform the method steps, in any order, falls within the scope of the present invention.

Prior to the method steps, a workspace is opened and assets associated with that workspace are displayed on display surface 221. In addition, a mode change input may be received, either via gesture-sensitive surface 231 or a cursor input, where the mode change input may indicate that one or more assets of the workspace or all assets in the workspace are changed to locked position mode. In some embodiments, the mode change input may be associated with a particular region of the displayed workspace, and all assets either partially or completely within the particular region are changed to locked position mode.

As shown, a method 700 begins at step 701, in which collaboration system controller 210 receives a gesture-based input associated with a location in the displayed workspace. In step 702, collaboration system controller 210 determines which asset corresponds to the location associated with the gesture-based input. In step 703, collaboration system controller 210 determines whether the asset determined in step 702 is in locked position mode, for example by requesting such information from collaboration server 110 or by retrieving such information from local database 270. If yes, method 700 proceeds to step 704; if no method 700 proceeds to step 705. In step 704, collaboration system controller 210 determines whether the gesture-based input is a reposition or resize input. If yes, method 700 ends; if no, method proceeds to step 705. In step 705, collaboration system controller 210 transmits a software application input to the software application associated with the asset, e.g., metadata 121, where the input is based on the gesture-based input. In step 706, collaboration system controller 210 updates metadata associated with the asset locally and/or on collaboration server 110 or database server 120.

Thus, method 700 enables all assets in a workspace or specific assets in a workspace to have locked position and sizing and/or other function modal states. In this way, inadvertent repositioning and/or resizing of assets in a workspace can be avoided.

In sum, embodiments of the invention set forth various approaches to displaying assets on a gesture-sensitive surface. By selectively switching all assets in a particular workspace or individual assets in the workspace to a locked position mode, assets can advantageously be interacted with by users without being accidentally repositioned or resized.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The claimed invention is:

1. A method for displaying content on a gesture-sensitive display surface, the method comprising:
    causing an interactive window asset to be displayed on the gesture-sensitive surface with at least one of an adjustable display height, an adjustable display width, and an adjustable display location on the gesture-sensitive display surface, wherein the interactive window asset includes at least one display output generated by a software application and is configured to receive one or more software application inputs via the gesture-sensitive display surface;
    receiving a mode change input via the gesture-sensitive display surface that places the interactive window asset in a locked position mode;
    in response to receiving the mode change input, causing the interactive window asset to be displayed on the gesture-sensitive display surface with a fixed display height, a fixed display width, and a fixed display location, wherein the fixed display height, the fixed display width, and the fixed display location cannot be changed until the interactive window asset is removed from the locked position mode, and, while the interactive window asset is in the locked position mode, interactions with the interactive window asset to adjust at least one of the fixed display height, the fixed display width, and the fixed display location are ignored;
    receiving a read-only mode input associated with the interactive window asset;
    after receiving the read-only mode input, receiving an annotation input associated with the interactive window asset;
    modifying the interactive window asset with an annotation based on the annotation input and causing the annotation to be displayed on the gesture-sensitive display surface;
    after modifying the interactive window asset with the annotation, receiving an input associated with closing the interactive window asset; and
    in response to receiving the input, deleting the annotation.

2. The method of claim 1, further comprising, in response to receiving the mode change input, causing a second interactive window asset to be displayed on the gesture-sensitive surface with a fixed display height, a fixed display width, and a fixed display location.

3. The method of claim 1, further comprising, in response to receiving the mode change input, causing each interactive window asset displayed within a particular display region of the gesture-sensitive display surface to be displayed with a respective fixed display height, a respective fixed display width, and a respective fixed display location.

4. The method of claim 1, further comprising, in response to receiving the mode change input, causing all interactive window assets displayed on the gesture-sensitive display surface to be displayed with a respective fixed display height, a respective fixed display width, and a respective fixed display location.

5. The method of claim 1, further comprising, prior to receiving the mode change input and in response to receiving an asset adjustment input associated with the interactive window asset, modifying at least one of the adjustable display height, the adjustable display width, and the adjustable display location.

6. The method of claim 5, wherein the asset adjustment input is received via the gesture-sensitive display surface.

7. A non-transitory computer readable medium storing instructions that, when executed by a processor, cause the processor to display content on a gesture-sensitive display surface, by performing the steps of:
  causing an interactive window asset to be displayed on the gesture-sensitive surface with at least one of an adjustable display height, an adjustable display width, and an adjustable display location on the gesture-sensitive display surface, wherein the interactive window asset includes at least one display output generated by a software application and is configured to receive one or more software application inputs via the gesture-sensitive display surface;
  receiving a mode change input via the gesture-sensitive display surface that places the interactive window asset in a locked position mode;
  in response to receiving the mode change input, causing the interactive window asset to be displayed on the gesture-sensitive display surface with a fixed display height, a fixed display width, and a fixed display location, wherein the fixed display height, the fixed display width, and the fixed display location cannot be changed until the interactive window asset is removed from the locked position mode, and, while the interactive window asset is in the locked position mode, interactions with the interactive window asset to adjust at least one of the fixed display height, the fixed display width, and the fixed display location are ignored;
  receiving a read-only mode input associated with the interactive window asset;
  after receiving the read-only mode input, receiving an annotation input associated with the interactive window asset;
  modifying the interactive window asset with an annotation based on the annotation input and causing the annotation to be displayed on the gesture-sensitive display surface;
  after modifying the interactive window asset with the annotation, receiving an input associated with closing the interactive window asset; and
  in response to receiving the input, deleting the annotation.

8. The non-transitory computer readable medium of claim 7, wherein the fixed display height and the fixed display width correspond to a displayed aspect ratio, and further comprising, after receiving the mode change input, updating metadata associated with the interactive window asset to indicate that the interactive window asset is being displayed on the gesture-sensitive display surface with the fixed display height, the fixed display width, and the fixed display location to allow the interactive window asset to be displayed with the displayed aspect ratio at a second display location on a second gesture-sensitive display surface, the second display location corresponding to the fixed display location.

9. The non-transitory computer readable medium of claim 7, further comprising, in response to receiving the mode change input, causing a second interactive window asset to be displayed on the gesture-sensitive surface with a fixed display height, a fixed display width, and a fixed display location.

10. The non-transitory computer readable medium of claim 7, further comprising, in response to receiving the mode change input, causing each interactive window asset displayed within a particular display region of the gesture-sensitive display surface to be displayed with a respective fixed display height, a respective fixed display width, and a respective fixed display location.

11. The non-transitory computer readable medium of claim 7, further comprising, in response to receiving the mode change input, causing all interactive window assets displayed on the gesture-sensitive display surface to be displayed with a respective fixed display height, a respective fixed display width, and a respective fixed display location.

12. The non-transitory computer readable medium of claim 7, further comprising, prior to receiving the mode change input and in response to receiving an asset adjustment input associated with the interactive window asset, modifying at least one of the adjustable display height, the adjustable display width, and the adjustable display location.

13. The non-transitory computer readable medium of claim 12, wherein the asset adjustment input is received via the gesture-sensitive display surface.

14. The non-transitory computer readable medium of claim 7, further comprising:
  after receiving the mode change input, receiving a second mode change input that undoes the mode change input; and
  after receiving the second mode change input, causing the interactive window asset to be displayed on the gesture-sensitive surface with at least one of the adjustable display height, the adjustable display width, and the adjustable display location on the gesture-sensitive display surface.

15. The non-transitory computer readable medium of claim 7, further comprising:
  after receiving the mode change input, receiving an input for the software application via the gesture-sensitive display surface; and
  providing the input to the software application.

16. The non-transitory computer readable medium of claim 7, wherein the fixed display height comprises a predetermined display height on the gesture-sensitive display surface, the fixed display width comprises a predetermined display width on the gesture-sensitive display surface, and the fixed display location comprises a predetermined display location on the gesture-sensitive display surface.

17. A display system, comprising:
  a gesture-sensitive display surface;
  a screen output module configured to:
    receive a mode change input via the gesture-sensitive display surface that places the interactive window asset in a locked position mode,
    receive a read-only mode input associated with the interactive window asset, after receiving the read-only mode input, receive an annotation input associated with the interactive window asset, and after the interactive window asset is modified based on the annotation input, receive a first input associated with closing the interactive window asset; and a rendering engine configured to:

cause an interactive window asset to be displayed on the gesture-sensitive surface with at least one of an adjustable display height, an adjustable display width, and an adjustable display location on the gesture-sensitive display surface, wherein the interactive window asset includes at least one display output generated by a software application and is configured to receive one or more software application inputs via the gesture-sensitive display surface, in response to the screen output module receiving the mode change input, cause the interactive window asset to be displayed on the gesture-sensitive display surface with a fixed display height, a fixed display width, and a fixed display location, wherein the fixed display height, the fixed display width, and the fixed display location cannot be changed until the interactive window asset is removed from the locked position mode, and, while the interactive window asset is in the locked position mode, interactions with the interactive window asset to adjust at least one of the fixed display height, the fixed display width, and the fixed display location are ignored, cause the interactive window asset to be modified with an annotation based on the annotation input and cause the annotation to be displayed on the gesture-sensitive display surface, and in response to the screen output module receiving the first input, cause the annotation to be deleted.

18. The display system of claim 17, wherein the gesture-sensitive display surface includes a first display screen of a first display device and a second display screen of a second display device that is adjacent to the first display screen.

19. The display system of claim 18, wherein the adjustable display location corresponds to a first portion of the first display screen and to a second portion of the second display screen.

* * * * *